Figure 1:
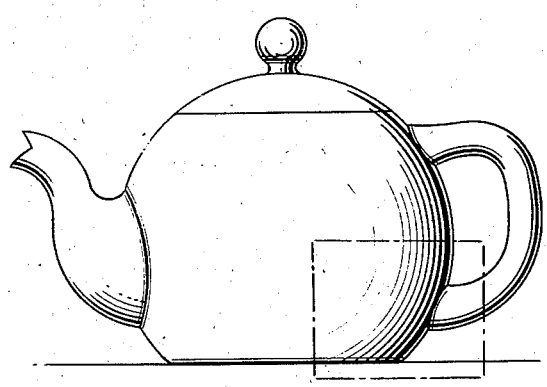

May 9, 1944. G. K. P. KRAFT 2,348,549
ELECTROPLATED RECEPTACLE
Filed April 6, 1943

CHROMIUM
NICKEL
COPPER
PORCELAIN

Inventor
GEORGE KONSTANTIN PONTUS KRAFT,

By Henry C. Parker
Attorney

Patented May 9, 1944

2,348,549

UNITED STATES PATENT OFFICE 2,348,549

ELECTROPLATED RECEPTACLE

George Konstantin Pontus Kraft, Stockholm, Sweden

Application April 6, 1943, Serial No. 482,067
In Sweden December 12, 1940

1 Claim. (Cl. 220—64)

The present invention relates to an improvement in receptacles made of electrically non-conducting vitreous materials, such as glass, porcelain, stoneware, etc., and having one or several handles directly attached to or made in one piece with the receptacle. More specifically the invention relates to household articles of the specified type, such as teapots, jugs, soup-basins and the like, which are provided with an outer metallic covering for protective and esthetic purposes. The object of the invention is to effect a sufficient heat insulation between the receptacle proper and its handle, in spite of the fact that the whole outer metallic shell which covers receptacle and handle is made in one piece, so as to prevent the handle from assuming an excessive temperature when the receptacle contains a hot liquid.

It is previously known to provide containers of this kind with an electrolytically deposited metallic coating in order to protect the brittle material from breakage due to rough handling or accidents. The electrolytic deposition of such a protective metallic shell on the surface of the brittle material entails several advantages, since already a metal coating with a thickness of about 0.5 mm. (1/50 inch) will provide a very efficient protection and, furthermore, may be polished, engraved or decorated so as to present a very attractive surface, giving to the receptacle the appearance of being entirely of metal, while preserving the sanitary and other advantages of porcelain, glass, etc. that are desirable for teapots and similar receptacles for hot beverages.

Household articles of this kind, particularly coffee and teapots and the like, have, in spite of these advantages, only received a limited use because of the fact that the metallized handle soon becomes too hot to be conveniently grasped by the unprotected hand when the receptacle is filled with a hot liquid. It has been attempted to prevent this heat transport by making the handle as a separate piece jointed to the receptacle proper with an insulating insertion. Quite apart from the fact that such arrangements are expensive and mechanically unsatisfactory, they have proven ineffective in all those cases where the outer metallic shell is made in one continuous piece, covering receptacle and handle without presenting any joints or other discontinuities, which for esthetic as well as practical reasons is the desired form.

This heat transport from receptacle to handle, which in the case of unmetallized porcelain and glass objects, is generally not perceptible to any such degree that it causes any inconvenience, has thus in the hitherto known metal protected articles of the kind described, been of such magnitude, even in the case of metal coatings with a thickness only amounting to a small fraction of an inch, that such metal coatings have proven impractical.

By experiments I have, however, discovered the reason for this strong heat transport and accumulation in the handle, which has enabled me to devise the way of providing sufficient heat insulation between receptacle and handle while still maintaining the continuous metallic shell, and with the receptacle and handle made in one piece without any insulating insertions between the same.

When electrolytically producing metal coverings of sufficient thickness to afford the desired protection of the underlying brittle non-conductive material, it is for technical reasons always necessary to employ such metals in the deposit which possess high electric conductivity, particularly copper, in more special cases silver or gold. Layers of these metals may alternate with layers of metals with lower conductivity, e. g., Fe, Ni, Cr, Cd, Zn or their alloys, but must always constitute the chief material of the deposit in order to make it possible to obtain a covering of sufficient thickness and elasticity. According to known electroplating processes the surface of the electrically non-conducting object is first rendered conductive by applying thereto a thin coating of gold, graphite or the like, on which one or several lays of for instance alternately nickel and copper may then be deposited by electrolytic means. It is possible by electroplating means to produce dense and well adhering copper deposits of practically any desired thickness even on strongly curved surfaces such as receptacles of the kind in question, thanks to the electroplating properties of copper baths, whereas less conductive metals, e. g., Fe, Ni, Cr, Cd, Zn, etc., can only be deposited in comparatively thin layers to avoid brittleness, sponginess, poor adhesion or other detrimental properties in the deposit. In general the ratio of thickness of each copper layer to the other metal layers is of the order of magnitude of 5:1. The employment of comparatively thick layers of copper is preferable not only for electroplating reasons but also because of the fact that copper is ductible and malleable, which makes it capable of offering better protection for the underlying brittle porcelain or glass material against blows and hits than most other metals which are electroplated onto the object. Whether copper is used alone or in alternate layers with, e. g., nickel, an outermost layer of chromium, gold, silver or other ornamenting or non-corroding metal is generally plated onto the underlying sheet of base metal. A suitable arrangement is to plate a thin layer of nickel on copper and to provide the nickel with a coating of chromium by known electroplating methods.

Figure 2:
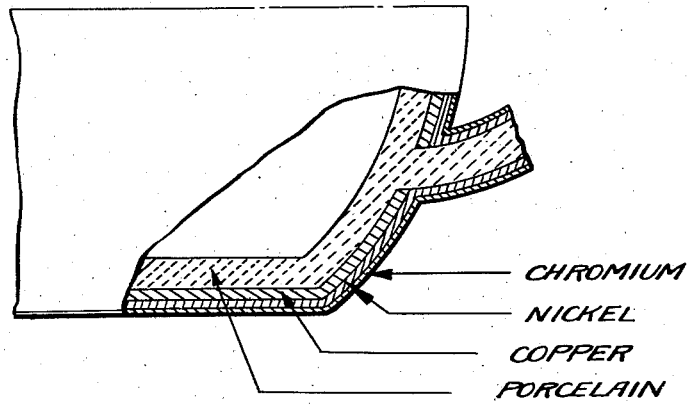

My invention can be explained in more detail by reference to the accompanying drawing which shows, more or less diagrammatically, an illustrative embodiment of a tea pot having metallic coatings in accordance with this invention. In this showing, Fig. 1 is an elevation of the tea pot, while Fig. 2 is an enlarged partial elevational view of the area outlined by the dotted lines in Fig. 1, the view being partly in vertical section, taken through the handle and body of the tea pot, showing the metal layers thereon. This figure is provided with legends showing the different metal layers and it will be noted that a layer of copper is provided on the body of the receptacle only, while both body and handle are coated with continuous layers of nickel and chromium. The copper layer is absent from the handle, this absence causing the handle to remain cool when the receptacle is filled with a hot liquid.

As already mentioned, such protective and ornamental electrodeposits of metals on household articles of vitreous materials, such as glass, porcelain, etc., which are provided with one or several handles, have proven of little value due to the fact that the handle very soon assumes an excessive temperature when the receptacle is filled with a hot beverage. This fact, which places such receptacles in the same class as receptacles made of metal throughout, has naturally been attributed to the known heat-conducting properties of metals in general. My systematic researches, however, have led to the surprising discovery that the presence of electrically highly conducting metals, e. g., copper, in the metal coating is the source of this unwanted heat-transfer from receptacle to handle. If, namely, in the covering on the handle only such metals are employed which have a lower conductivity, such as nickel and chromium, the heat transfer will become reduced to such a degree that the handle will remain about as cold as an unplated porcelain handle. The discovery of this surprising and singular phenomenon at once presented the way to overcome the above discussed disadvantages.

Owing to the shape which the handle in general possesses, it has proven possible to electroplate the same without any difficulty solely with the above metals having low electric conductivity. According to the invention a highly conductive metal, e. g., copper, is thus used only in the covering on the receptacle proper, whereas the handle or handles are wholly, or in more special cases at least for a certain distance near the zone of transition between handle and receptacle, protected from the electroplating action when the highly conductive metal, e. g., copper, is deposited on the object. By these expedients highly conductive metals will be absent in these places on the plated object, whereby a direct passage of heat from receptacle to handle by way of a highly conductive metal will become prevented in the stratum on the plated object underlying the surface-covering consisting of lower conductive metallic material. The other metals are, on the other hand, plated as nearly uniformly over receptacle and handle as possible so as to form a coherent outer covering over the entire object comprising receptacle proper and handle. Sufficient mechanical protection is in general obtained for the handle by this arrangement but, if desired, the total deposit of metals, other than copper, on the handle may be made heavier by expedients well known to any person skilled in the art of electroplating to make up for the missing layer of copper.

No other explanation of this surprising heat-conducting effect than the considerable difference in regard to heat conductivity of on the one hand copper and similar electrically high-conducting metals and on the other hand electrically low-conducting metals, has so far been found. Even considering the fact that copper is an about 3 to 4 times better heat conductor than for instance nickel or chromium, it is still highly surprising that a layer of copper in the metal-covering, with a thickness only a few tenths of a millimeter, will exercise such a marked influence on the heat transport. Tests carried out on two perfectly similar receptacles (ordinary coffee pots of porcelain with handle in one piece therewith of the same material) both of which were electroplated with a base of copper on nickel with a continuous covering of chromium on nickel over the whole object of equal thickness and with perfectly identical appearance, the only difference being that the copper layer in the deposit was missing on the handle of one pot whereas it formed a coherent stratum in the deposit covering the entire other pot, gave as result that in the latter case it was impossible to grasp the handle of the pot without burning the hand after having filled the pot with a hot fluid, while the handle on the other pot under the same circumstances remained practically as cool as an unplated porcelain handle. Further tests have demonstrated that it is without practical importance if the copper layer is close to the porcelain or deposited as an intermediate layer, for instance between two layers of nickel. The heat-conducting effect will even appear in cases where the copper layer has a thickness considerably below 0.1 mm. In all these cases the heat effect in the handle will be practically the same, wherein it is actively eliminated when copper (or other highly conductive metal) is missing in the covering on the handle.

A very thin coating of a highly conducting metal such as gold or silver, which may sometimes be desirous for ornamental purposes in the form of a continuous or fretted top layer on the outside of household objects of this kind will, owing to its extreme thinness (order of magnitude one hundredths millimeter), not have the same effect as the stratum of copper in the metal covering proper, for which reason such a thin ornamenting deposit on the outer surface may be used without detrimental effect.

I claim:

A receptacle having an integral body and a handle of vitreous material for holding hot liquids, said body only being provided with an electro-deposited protective coating of copper while said body and handle are covered with an electro-deposited coating of at least one metal selected from the group consisting of nickel and chromium, at least the outermost of these layers forming a coherent continuous covering of metal for the outer surface of said body and handle; the absence of copper in the covering on the handle causing said handle to remain cool when a hot liquid is placed in said receptacle.

GEORGE KONSTANTIN PONTUS KRAFT.